Figure 1:
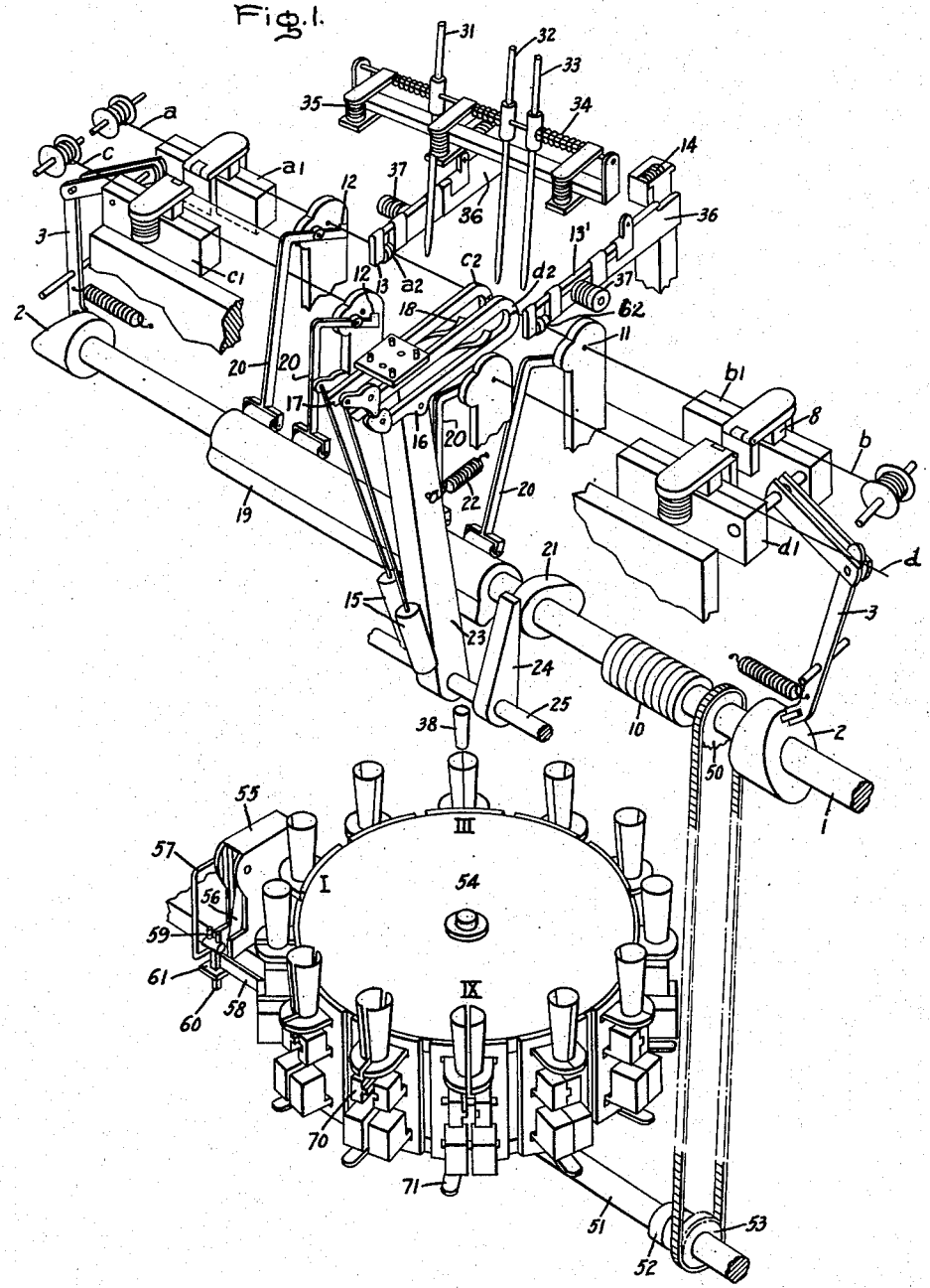

June 3, 1941.  A. HANNAFORD  2,244,554
WIRE WELDING MACHINE
Filed April 20, 1939  3 Sheets-Sheet 1

Inventor:
Arthur Hannaford,
by Harry E. Dunham
His Attorney.

Inventor:
Arthur Hannaford,
by Harry E. Dunbar
His Attorney.

Patented June 3, 1941

2,244,554

UNITED STATES PATENT OFFICE 2,244,554

WIRE WELDING MACHINE

Arthur Hannaford, Tottenham, England, assignor to General Electric Company, a corporation of New York Application April 20, 1939, Serial No. 268,968 In Great Britain April 22, 1938

5 Claims. (Cl. 140—112)

This invention relates to automatic welding machines for the manufacture of leading-in wires for electric lamps and similar devices which require a composite length of wire built up from individual wires joined end to end and of different lengths and having different characteristics.

A machine is known for the manufacture of such leading-in wires built up from two or from three separate pieces of wire. For two wires the machine comprises two guides in line with a gap between them. From the outer end of each guide a wire is fed and advanced into the gap a predetermined amount by a reciprocating slide furnished with gripping means for the wire. These slides may be reciprocated by cams during one revolution of a main driving shaft, the gripping means being also controlled by cams on the shaft. The wires are then each gripped by a pair of fingers and are cut by means of a knife actuated by a cam on the main shaft.

A welding heat is then applied to the adjacent ends whilst the gripping fingers press the ends of the wires together longitudinally to form a butt weld. The fingers then open and the welded composite wire is ejected from them, the fingers return to their former longitudinal position, the position in which each pair of fingers receives a fresh length of wire being thus re-established.

For forming the composite wire from three different sections a third guide and slide is arranged parallel to the other two. The third wire is similarly fed to gripper fingers or tongs which are mounted on an arm secured to a rocking shaft, cam actuated from the main shaft. After this third wire has been gripped by the tongs and severed simultaneously with the other two wires, the tongs are advanced by the arm to bring the severed section of the third wire in line with and between the adjacent ends of the other two wires. These other two wires are then advanced towards each other to butt against the ends of the third wire whilst a welding heat is applied at the two points of contact.

For some reasons, such as for providing a fuse element in a lamp leading-in wire, the composite leading-in wire would need to be built up from four separate wires, for example a length of wire such as nickel for connection to the filament in the lamp, a length of platinum or other wire of similar coefficient of expansion for sealing into the lamp bulb, a length of fuse wire for protection of the lamp circuit, and a length of wire such as copper for connecting the fuse wire to the lamp cap terminal.

The welding of four such wires together in a single automatic operation presents great technical difficulties which, so far as I am aware, have not heretofore been successfully overcome.

According to the invention the welding is effected in a single automatic operation by a process which includes the steps of holding the four wires in a longitudinal row with their outer pairs of ends in approximate contact and the inner pair of ends in overlapping contiguity, applying a welding heat approximately simultaneously to the three points at which the welds are to be effected and during the heating advancing the two outer wires longitudinally towards each other, so as to form substantially two butt-ended welds and one lap-ended weld.

With the object of welding together in one operation four lengths of wire such as those mentioned above by way of example I preferably employ a machine of the above described kind and add a fourth guide and slide in line with the third, spaced from it by a gap and provided with similar wire feeding, gripping and severing mechanism. The fourth tongs or gripping fingers mechanism may conveniently be carried on the same arm of the rocking shaft and performs practically the identical motions of those for the third wire and simultaneously.

These tongs for the fourth wire advance the severed piece of wire simultaneously with the advancing of the third wire and practically into line with the other three wires. However, this fourth wire is cut to a length slightly longer than the space provided for it between the adjacent wires which are held in line, so that an overlapping end lies against the end of an adjacent wire in side to side engagement.

By this means the first and third wire can be buttwelded by the end-wise movement of the first wire and simultaneously or almost simultaneously the fourth wire can be butt welded to the second wire and its other end to the third wire by a lap weld.

It has already been proposed to form a leading-in wire built up of four wires, such as those referred to in the example mentioned above, and to encase the fuse wire in an envelope of glass.

By a further feature of my invention, I accomplish this step also on the same machine and in the manner now to be described.

As the composite leading-in wires, after the welding operation, are released one by one from the gripper fingers, they are caused to fall down a chute in a uniform direction of landing to thread a glass tube presented to the chute opening. The threaded tube and wire are held in correct relative position while heat is applied to the ends of the tube to seal it to the wire. The complete article is then released. Glass tubes are fed singly from a magazine and brought into position each to receive a wire.

To effect these operations I preferably provide a horizontally rotatable turret having a plurality of heads which is stepped round by one step for each complete operation of the welding machine. Each head is furnished with a pair of jaws adapted to receive and hold a glass tube positioned therein and the jaws are furnished with an opening at the top to receive and guide a leading-in wire through the glass tube and a stop at the bottom on which the wire rests positioned relatively to the tube. The jaws are normally held closed, but at a first indexed position they are opened and a glass tube is fed into the jaws by transfer tongs from a magazine and the jaws re-closed. At a next indexed position, a welded leading-in wire falling down the chute enters the guide on the turret head, threads the glass tube and rests on the stop. At a next step, gas jet flames are directed to the ends of the tube to soften them and at a next step other gas jets fuse the ends of the tube to the wire. At a subsequent step the glass retaining jaws are opened and the stop displaced so as to allow the completed article to drop from the turret.

The magazine for the glass tubes is mounted on the machine frame and the tubes are advanced from it into a position in which transfer tongs engage a tube and transfer it by an arcuate movement to the opened jaws on the turret.

Figure 2:
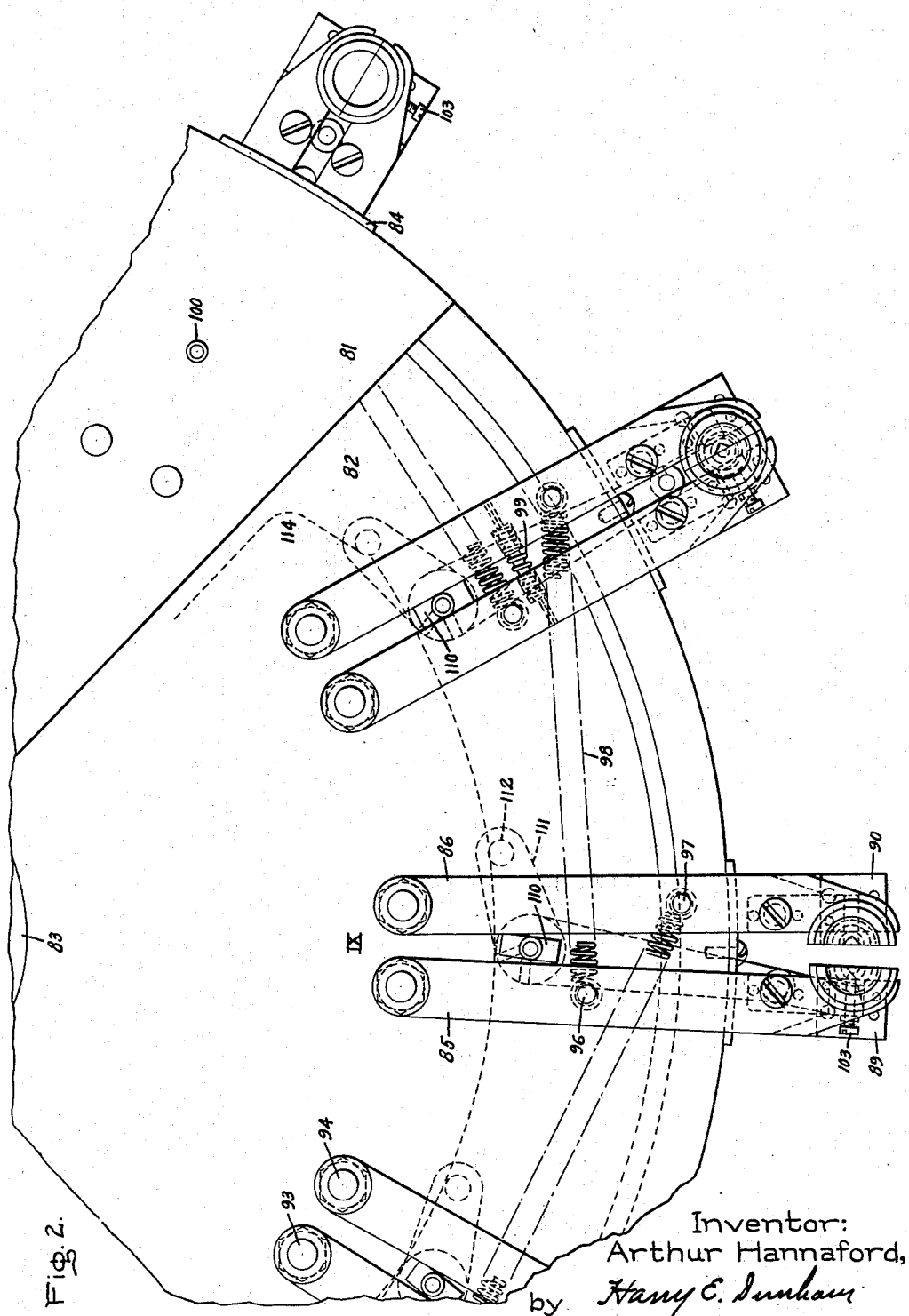
Figure 3:
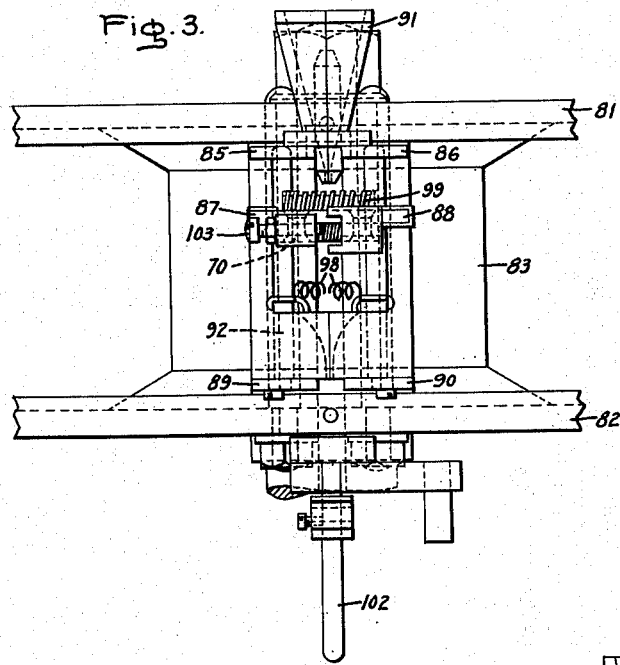
Figure 4:
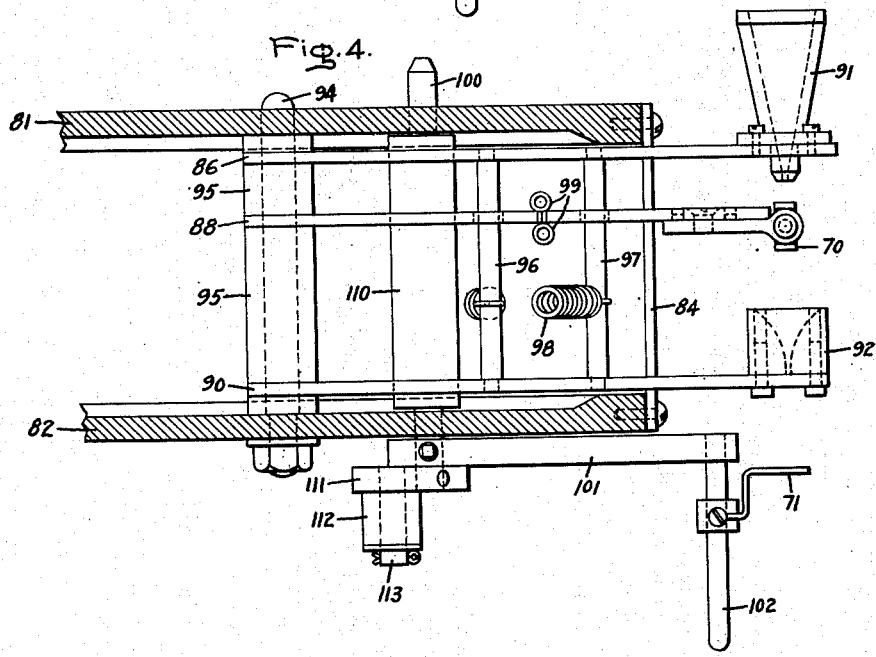

The accompanying drawings show a preferred form of wire welding apparatus in accordance with the invention, Fig. 1 being a schematic arrangement for showing the operations of the machine; Figs. 2, 3 and 4 being respectively a plan, front and side elevation of a part of the turret in which the glass sealing operations are performed.

Referring to Fig. 1, the main shaft 1 has at each end a cam 2, which by rotation of the shaft rocks a lever 3. Each lever 3 is linked to two slides a1, c1 and b1, d1 respectively which are thereby reciprocated towards and away from each other in two parallel tracks. Each of the four wires a, b, c and d—from which the composite lengths are formed—passes from a reel mounted at an end of the machine over one of the slides and an electromagnetically controlled wire-gripping means 8 is carried on each of the four slides. Each magnet has a circuit completed by a separate one of the contact-making cams 10 arranged in a row on the main shaft. These cams are set so that each wire is gripped for a predetermined time during the inward movement of the slides, thus feeding a predetermined length of wire through a guide 11 past a knife 12 and between the open pair of fingers of the respective one of the gripping tongs a2, b2, c2, d2. The fingers of the tongs are then closed over the wire. Of the tongs a2 and b2 the outer finger 13 on the rod 13$^1$ is retracted against a spring releasing force by the electromagnet 14 energised through contact cams of the group 10. The tongs c2 and d2 likewise are closed by the similar action of magnets 15 which close the lower finger 16 against the relatively fixed upper finger 17 against the force of a releasing spring 18.

After the four tongs a2, b2, c2 and d2 have closed to hold the wires, cam 19 rocks the four levers 20 which raise the cutting knives 12 carried by said levers, to cut the four wires, thus leaving selected and suitably spaced lengths of wires a and b held in line by tongs a2 and b2 and contiguous lengths of wire c and d held in a parallel line by tongs c2 and d2.

By continued rotation of the main shaft cam 21 is rotated to about the position shown thus allowing spring 22 to rock arm 23 and cam 24 on the lay shaft 25 to the position in which the tongs c2 and d2, which are shown as mounted on either side of the same arm 23, to the position shown in which the lengths of wire c and d are held in line between the wires a and b.

Opposite the three adjacent ends of wire thus formed are the three oxy-hydrogen gas jet pipes 31, 32 and 33. Their flames are normally directed to points clear of the wires by means of springs 34 on their pivot spindles, but the flames are brought to bear on the junction points individually and almost simultaneously at a time and for a period determined by contact cams of the group 10 which separately energise the electromagnets 35 to deflect the jets to the welding points.

The tongs a2 and b2 are mounted on leaf springs 36 and are held flexed outwards by electromagnets 37 energised through cams of the group 10. At the time the welding heat is applied, the magnets 37 are temporarily de-energised and the two tongs close together by a predetermined amount, thus butting the welding between wires a and c and between the wires b and d. The wires c and d are fed so as to overlap slightly and the joint between these two wires is virtually a lap weld.

The welds thus completed the four pairs of fingers are opened and the welded composite length is released and falls headed in the right direction down a chute, only the exit from the chute being shown at 38. All operations are completed during one revolution of the shaft.

It is obvious that the construction of the apparatus may be varied very considerably without departing from the invention, many modifications being determined by the size length and properties of the various wires to be welded. Moreover although oxy-hydrogen flames are preferred for welding wires such as those suggested for electric lamps, yet the welding heat could be produced by electric current, such method of welding wires have been proposed, for instance in Patent 2,137,181, C. H. Quackenbush, dated November 15, 1938.

If a glass tube is to be sealed over a portion of the composite wire so formed, such as for encasing a length of fuse wire, the following additional apparatus is employed:

An auxiliary shaft 51 is driven through a clutch 52 by wheel 53 which is driven by a wheel 50 on the main shaft in a one-to-one ratio. Shaft 51 drives the turret 54 through Geneva gearing (not shown), such as by a cam on the shaft engaging in turn pegs on the under side of the turret arranged in a circle, so as to rotate the turret horizontally one step for each revolution of the main shaft, twelve indexed positions being shown.

Mounted on a part of the machine above the auxiliary shaft is a magazine 55 for the glass tubes. Such glass tube magazine is an article in common use in the electric lamp making industry. In it tubes are held in stacked relation and gates 56 at the forward bottom end of the magazine form locks through which one tube at a time is advanced to an inclined platform by respective lowering and raising of the gates effected by the rocking of a lever arm 57 actuated by a cam on the auxiliary shaft (not shown).

Operating in conjunction with the magazine is a tube transferring arm 58 which gathers a tube as it is released from the magazine and, swinging it through a right angle presents it to open jaws on the turret.

This transfer arm 58 is also a well known piece of apparatus used in conjunction with the magazine. The arm carries two spaced pairs of resilient fingers 59, the fingers at one side of the pairs being hinged, these fingers being biased to a closed position by a spring (not shown) coupling a fixed part of the arm to a tongs-like extension 60 of the hinged fingers that depends to one side of the arm and terminates in an inclined cam surface adapted to be engaged by a co-operating fixed cam surface 61 below the tube exit of the magazine, whereby to open the pairs of fingers to receive a tube on its discharge from the magazine and to cause the tube to be held by closure of the fingers as rotation of the arm brings the extension out of engagement with the fixed cam.

Once during each revolution of the shaft 51 a cam thereon (not shown) rocks the lever arm 57 of the magazine which discharges a tube into the opened fingers of the tube transfer arm. Another cam on the shaft (not shown) effects through appropriate gearing a rotation of the transfer arm from the horizontal position shown to a vertical position in which it presents the tube between open jaws on the turret in what may be called the first stepped position.

The turret 54 has similar jaws for each indexed position the jaws being pivoted to the turret and spring biased closed. A cam on the auxiliary shaft (not shown) moves through a rocking shaft a lever by which while the turret remains stationary, the particular turret jaws 70 at position I are opened sufficiently long to receive the glass tube and then close on it. The transfer arm being returned by a spring to its position in which to receive another tube from the magazine, the tube being held by the now closed turret jaws and having slid from the resilient fingers of the transfer arm on the return-motion of the latter.

The tube having been positioned with its ends projecting above and below the jaws 70, the turret is stepped round and at the step III the funnel on the turret jaws receives one of the composite wires as it is released from the gripper fingers after the welding and discharged through the chute 38.

The funnel guides the end of the wire through the tube so that it rests against a stop 71, correctly positioned.

At subsequent stepped positions gas flames (not shown) are directed to the exposed top and bottom ends of the tube, preferably in a tangential direction from opposite sides. By such gas flames the tube ends are first softened and then fused to the wire at a subsequent step. At a further step the now completed article is allowed to cool and at a further step IX the jaws are opened and the bottom stop 71 swung to one side and the article allowed to fall from the turret to a removable receptacle. The jaws close again as the turret rotates further. The opening and closing of the jaws is effected by a fixed cam plate which engages a lever under the turret for opening the jaws but the opening of the jaws at position I to receive the glass tube is effected by a separate lever which, as mentioned above, is moved by a cam on the auxiliary shaft to open the jaws for a part of a revolution of the shaft whilst the turret remains stationary.

As mentioned, the number of stepped positions may be varied and the number of operations augmented, such for instance as by the provision of a fixed plate between positions I and II over which the glass tubes pass and are corrected as to their vertical position.

Referring now to Figs. 2, 3 and 4, the turret 54 comprises a top plate 81, which in Fig. 2 has been partly cut away to expose the jaw mechanism, and a bottom plate 82 in the form of discs spaced apart by a central hub member 83 and plates 84 in the stepped positions around the periphery. This plate 84 has been removed in Fig. 3.

At each of the stepped positions, such as IX there are a pair of radially extending pivoted arms 85—86 for the funnel guide jaws 91, a pair of arms 87—88 for the tube jaws 70 and a pair of arms 89—90 for the bottom wire guide jaws 92. These arms extend through slots in the plate 84 and are pivoted on pins 93—94 extending between plates 81 and 82, the arms being vertically spaced on the pins by distance pieces 95 and spacing rod members 96 and 97. Each arm carries at its outer end one of the co-operating halves of the respective jaws. The jaws are held closed by long coiled springs 98 which extend between the outer arms of adjacent pairs of arms, as shown in Fig. 2. There is also a short spring 99 between the arms 87 and 88 (for clearness not shown at position IX). Secured to a pin 100 which is rotatable in plates 81 and 82 and passes between the pairs of arms is an arm 101 having a pin 102 depending from it to which is adjustably clamped the platform or stop 71. The jaws 91 and 92 are formed of halves which are symmetrical, and the two halves of the jaws 70 are also symmetrical except for a recessed part on one side and a gap-adjusting screw 103 on the other.

Secured to pin 100 between the plates 81 and 82 is a rectangular lever member 110 the longer sides of which lie against the inner sides of the pairs of arms in the normally closed position of the jaws. Also secured to pin 100 below plate 82 is a lever arm 111 which carries a roller 112 from a dependent pin 113, the arm 111 extending from the pin in a direction slightly inclined towards the centre of the turret. A segmental cam plate 114, shown dotted, secured to the machine frame effects the opening of the jaws at step IX and a subsequent step by engaging roller 112, thus moving arm 111 outwards and turning lever member 110 between the jaw arms to move them about their pivots 93 and 94, respectively. At the same time arm 101 and with it stop 71 is moved to one side of the central position it formerly occupied. On roller 112 leaving the cam face 114 the springs 98 reclose the jaws.

The jaws reach step I in a closed state and while the turret is stationary the jaws at this step are opened to receive a glass tube and closed again before the tube transfer arm starts its return swing to the magazine, thus causing the fingers of the retreating arm to slide off the held tube. The opening of the jaws at this step is effected by a lever at the end of a vertical rod which is turned into and out of engagement with the lever arm 111. The vertical rod is given the necessary momentarily rotational movement by means of a cam on the auxiliary shaft which engages an arm on the rod once at each revolution of the shaft. This mechanism for opening the jaws at stage I are not shown on the drawings.

What I claim as new and desire to secure by Letters Patent of the United States, is:

1. An automatic welding machine comprising means for holding four separate lengths of wire in a longitudinal row with the outer pairs of ends in approximate contact and the inner pairs of ends in overlapping contiguity, means for applying a welding heat approximately simultaneously to the adjacent ends of the wires and means effective during the heating for advancing the two outer wires longitudinally towards each other, so as to form substantially two butt-ended welds and one lap-ended weld.

2. An automatic welding machine for producing lengths of wire composed of four separate lengths of wire welded together in end-to-end relation from four continuous lengths of wire, comprising means for feeding two of the wires into longitudinal slightly overlapping contiguity, means for holding the two wires thus positioned, means for severing the two wires to predetermined lengths, means for feeding the other two wires longitudinally to approach each other to a predetermined spaced relationship, means for holding the latter two wires thus positioned, means for severing the latter two wires to predetermined lengths, means for moving one pair of the held wires into a single row with the other pair, means for applying a welding heat at the three points to be welded and means for moving the outer two wires together during the time that the welding heat is being applied.

3. An automatic welding machine comprising a rotatable shaft, a plurality of cam members mounted on the shaft, means for advancing two pairs of wires towards each other in two parallel lines, means for cutting one of the pairs of wires to predetermined lengths, means for moving the cut pair of wires into end-to-end relation between the other pair, means for holding the wires thus positioned, means for applying a welding heat to the adjacent ends of the wires, means for advancing the outer wires towards each other during the time the heat is applied, means for cutting the outer wires to predetermined lengths, means for releasing the welded composite length, all the above means being actuated by the cams and restored to their initial positions during one revolution of the shaft.

4. In a wire welding machine means for advancing towards each other the respective ends of two pairs of wires in two parallel lines, means for gripping individually the lengths of the wires so advanced, means for cutting one pair of the wires so advanced to predetermined lengths and means for transporting by their gripping means these two wires to a position approximately in line and contiguous with the other pair.

5. The method of welding four wires together in a single operation which comprises holding the four wires in a longitudinal row with their outer pairs of ends in approximate contact and the inner pair of ends in overlapping contiguity, applying a welding heat approximately simultaneously to the three points at which the welds are to be effected and, during the heating, advancing the two outer wires toward each other to form two butt-ended welds and one lap-ended weld.

ARTHUR HANNAFORD.